(12) United States Patent
Löfskog et al.

(10) Patent No.: US 10,801,439 B2
(45) Date of Patent: Oct. 13, 2020

(54) PISTON FOR A CYLINDER FOR AN INTERNAL COMBUSTION ENGINE

(71) Applicant: VOLVO TRUCK CORPORATION, Gothenburg (SE)

(72) Inventors: Frank Löfskog, Olofstorp (SE); Aurélien Tricoire, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/091,148

(22) PCT Filed: Apr. 8, 2016

(86) PCT No.: PCT/EP2016/057721
§ 371 (c)(1),
(2) Date: Oct. 4, 2018

(87) PCT Pub. No.: WO2017/174143
PCT Pub. Date: Oct. 12, 2017

(65) Prior Publication Data
US 2019/0128213 A1    May 2, 2019

(51) Int. Cl.
*F02F 3/14* (2006.01)
*C23C 4/11* (2016.01)
(Continued)

(52) U.S. Cl.
CPC .................. *F02F 3/14* (2013.01); *C23C 4/01* (2016.01); *C23C 4/02* (2013.01); *C23C 4/06* (2013.01);
(Continued)

(58) Field of Classification Search
CPC ....... F02F 3/14; F02F 3/10; F02F 3/12; C23C 4/01; C23C 4/11; C23C 4/134;
(Continued)

(56) References Cited

U.S. PATENT DOCUMENTS

| 5,384,200 A | 1/1995 | Giles et al. |
| 2003/0196547 A1 | 10/2003 | Bischofberger et al. |

(Continued)

FOREIGN PATENT DOCUMENTS

| CN | 101970828 A | 2/2011 |
| CN | 102762836 A | 10/2012 |

(Continued)

OTHER PUBLICATIONS

International Search Report (dated Dec. 2, 2016) for corresponding International App. PCT/EP2016/057721.

(Continued)

*Primary Examiner* — Joseph J Dallo
*Assistant Examiner* — Yi-Kai Wang
(74) *Attorney, Agent, or Firm* — Venable LLP; Jeffri A. Kaminski

(57) ABSTRACT

A piston for a cylinder for an internal combustion engine has a piston bowl surface adapted for facing a combustion chamber of the cylinder, the piston bowl surface being provided with a thermal barrier coating layer, wherein the thermal barrier coating layer is provided on a plurality of circumferentially spaced surface parts of the piston bowl surface. A method for producing a piston for a cylinder for an internal combustion engine includes the steps of providing a piston for a cylinder for an internal combustion engine, the piston having a piston bowl surface adapted for facing a combustion chamber of the cylinder, and providing the piston bowl surface with a thermal barrier coating layer, wherein the step of providing the thermal barrier coating layer is made on a plurality of circumferentially spaced surface parts of the piston bowl surface.

43 Claims, 6 Drawing Sheets

(51) Int. Cl.
*C23C 4/01* (2016.01)
*F16J 1/00* (2006.01)
*F02F 3/12* (2006.01)
*F02F 3/10* (2006.01)
*F02B 23/06* (2006.01)
*C23C 4/134* (2016.01)
*C23C 4/02* (2006.01)
*C23C 4/06* (2016.01)

(52) U.S. Cl.
CPC ............... *C23C 4/11* (2016.01); *C23C 4/134* (2016.01); *F02B 23/0603* (2013.01); *F02B 23/0651* (2013.01); *F02B 23/0669* (2013.01); *F02B 23/0672* (2013.01); *F02F 3/10* (2013.01); *F02F 3/12* (2013.01); *F16J 1/00* (2013.01); *F02B 2023/0612* (2013.01); *Y02T 10/125* (2013.01)

(58) Field of Classification Search
CPC ......... C23C 4/02; C23C 4/06; F02B 23/0603; F02B 23/0651; F02B 23/0669; F02B 23/0672; F02B 2023/0612; F16J 1/00; Y02T 10/125
USPC ...................................................... 123/193.6
See application file for complete search history.

(56) References Cited

U.S. PATENT DOCUMENTS

| | | | |
|---|---|---|---|
| 2007/0084449 A1 | 4/2007 | Najt et al. | |
| 2007/0261663 A1 | 11/2007 | Lineton et al. | |
| 2008/0149897 A1 | 6/2008 | Burkle | |
| 2010/0258076 A1* | 10/2010 | Eismark | F02B 23/0678 123/279 |
| 2012/0318230 A1* | 12/2012 | Omura | F02B 23/104 123/193.6 |
| 2013/0025561 A1* | 1/2013 | Gabriel | C23C 4/08 123/193.6 |
| 2013/0118438 A1* | 5/2013 | Lineton | F02B 23/0603 123/193.6 |
| 2015/0004308 A1* | 1/2015 | Merrill | C23C 4/01 427/142 |
| 2015/0330507 A1* | 11/2015 | Kamura | C23C 4/06 277/444 |
| 2016/0133431 A1* | 5/2016 | Hunt | H01J 35/105 378/132 |
| 2017/0268457 A1* | 9/2017 | Azevedo | F02F 3/0092 |
| 2019/0093596 A1* | 3/2019 | Dimascio | F02F 3/12 |

FOREIGN PATENT DOCUMENTS

| | | |
|---|---|---|
| CN | 102925844 A | 2/2013 |
| CN | 104024616 A | 9/2014 |
| JP | 2000008857 A | 1/2000 |
| WO | 9313245 A1 | 7/1993 |
| WO | 2013066924 A1 | 5/2013 |
| WO | 2015072945 A1 | 5/2015 |

OTHER PUBLICATIONS

China Office Action and Search Report dated Jul. 13, 2020 in corresponding China Application No. 201680084405.5, 12 pages.

* cited by examiner

PISTON FOR A CYLINDER FOR AN INTERNAL COMBUSTION ENGINE

BACKGROUND AND SUMMARY

The present disclosure relates to a piston for a cylinder for an internal combustion engine, the piston having a piston bowl surface adapted for facing a combustion chamber of the cylinder, the piston bowl surface being provided with a thermal barrier coating layer. The disclosure also relates to a method for producing a piston for a cylinder for an internal combustion engine, comprising the steps of providing a piston for a cylinder for an internal combustion engine, the piston having a piston bowl surface adapted for facing a combustion chamber of the cylinder, and providing the piston bowl surface with a thermal barrier coating layer. The disclosure also relates to an internal combustion engine and a vehicle which are provided with such a piston.

In internal combustion engines heat is added through the combustion of fuel and is built up inside the cylinders of the engine. Developments relating to for example the combustion process and to the design of the engine itself have led to an increase in resulting pressures and temperatures within the cylinders during the combustion. This in turn puts increased demands on such issues like the materials of which the engine is made, and in particular on the parts which are in direct contact with the combustion process such as the cylinder head, cylinder and piston. The piston top is subjected to high demands. Particular attention is given to the effects of high material temperatures, material degradation, oxidation and cracks. High temperatures in the piston material is also a cause of building of coke on the areas of the piston in contact with oil. These effects have been reduced for example through the use of high strength materials or of high heat resistant materials, or the combination of both. Further ways to handle these problems have been to add a temperature insulating coating or a high strength coating on the piston surface such that the underlying material is protected. The combustion parameters have also been adapted in an attempt to reduce the heat load on the piston.

A problem arising from the application of an insulating coating on the piston surface is that although the piston itself is protected from the high demands, the heat is instead conveyed to and absorbed by the surrounding parts of the combustion chamber, where the heat is built up in an uncontrolled manner and similar problems as for the piston may arise.

A heat insulating coating of a kind which is used in these circumstances is called a thermal barrier coating. An example of such coating is disclosed in U.S. Pat. No. 3,976,809.

It is still a problem to handle the build-up of heat in parts within and surrounding the combustion chamber of an internal combustion engine.

It is thus desirable to at least to some extent alleviate the shortcomings discussed above in relation to heat build-up, and to make improvements to a piston of a cylinder of an internal combustion engine, especially to the dissipation of the heat load and the reduction of temperature maxima in the material.

The present disclosure relates according to a first aspect to a piston for a cylinder for an internal combustion engine, the piston having a piston bowl surface adapted for facing a combustion chamber of the cylinder, the piston bowl surface being provided with a thermal barrier coating layer, wherein the thermal barrier coating layer is provided on a plurality of circumferentially spaced surface parts of the piston bowl surface.

The thermal barrier coating has commonly been provided on the whole piston surface in order to insulate the underlying piston material from the direct heat influence and to reduce the heat build-up. When instead providing the thermal barrier coating on a plurality of circumferentially spaced surface parts of the piston bowl surface the heat load is reduced underneath the coated surface parts, whereas the uncoated surface parts are open for heat reception. In comparison to the commonly designed piston, the piston according to this disclosure is assimilating more heat energy such that surrounding parts of the combustion chamber is exposed to less heat, and at the same time the heat is more evenly distributed within the piston. Underneath the coated surface parts the maximum temperature is reduced in comparison to the general un-coated design, whereas the maximum temperature at the uncoated surface parts may be somewhat increased. The heat energy is hence more evenly distributed within the piston and the maximum temperature at any single point is reduced such that the risk for material degradation is reduced and the risk for coke build-up underneath the piston crown is also reduced. The thermal expansion of the piston material and the coating may be different causing high stresses in the coating with the risk of coating crack and/or delamination from the piston material. Having a plurality of coated parts of the piston will allow larger thermal expansion of the piston material with less stress build-up in the coating. Thereby the durability and expected longevity of the piston is consequently increased.

According to an embodiment a surface extension of each thermal barrier coating layer surface part is adapted to lower a temperature of the piston at the surface part below a threshold temperature, the threshold temperature being a critical temperature for piston material corrosion. In particular the thermal barrier coating layer may be chosen to reduce the heat build-up underneath the coated surface parts such that a critical temperature for piston material corrosion is not reached such that the expected piston longevity is prolonged.

According to an embodiment the thermal barrier coating layer is made of a heat insulating ceramic material. Such materials are having a low thermal conductivity. Such materials reduce the stresses on the underlying material and improve the adhesion thereto.

According to an embodiment the heat insulating ceramic material comprises zirconium oxide.

According to an embodiment the piston bowl surface comprises at least one fuel spray impingement portion and wherein a position of at least one of the thermal barrier coating layer surface parts at least partly covers the fuel spray impingement portion. A piston is subjected to fuel spray impingement at one or several portions within the cylinder and a resulting concentrated heat load at that or those portions. The heat load is increased at the fuel spray impingement portion. Through the location of the thermal barrier coating layer surface parts to at least partly covering said fuel spray impingement portion heat build-up at said portion is reduced such that piston material degradation is in turn reduced. Also the coke build-up underneath the piston crown at the fuel spray impingement portion is reduced.

According to an embodiment at least one of the thermal barrier coating layer surface parts is centred with regard to its associated fuel spray impingement portion. A close overlap between the at least one thermal barrier coating layer surface part and the associated fuel spray impingement portion improves the heat or temperature distribution and dissipation within the piston further.

According to an embodiment the piston bowl surface comprises a circumferential rim portion and a floor portion connected to and surrounded by the circumferential rim portion, wherein at least one of the thermal barrier coating layer surface parts is located at and has an extension along the circumferential rim portion. The fuel spray impingement portion is generally located having an extension along the circumferential rim portion such that an improved heat or temperature distribution within the piston will be achieved hereby.

According to an embodiment each thermal barrier coating layer surface part along the circumferential rim portion is distended from one another by a piston bowl surface without any thermal barrier coating layer. Through the positioning of uncoated piston bowl surface in between each thermal barrier coating layer surface part along the circumferential rim portion, the uncoated surface parts will achieve increased heat absorption at these parts. The overall heat distribution and dissipation within the piston is consequently improved.

According to an embodiment each thermal barrier coating layer surface part is surrounded by a piston bowl surface without any thermal barrier coating layer. An even further improved heat distribution and dissipation within the piston is hereby achieved.

According to an embodiment each thermal barrier coating layer surface part has an extension into the piston bowl. This corresponds well with the location and spread of the fuel spray impingement portion(s).

According to an embodiment each thermal barrier coating layer surface part has an extension on both sides of the circumferential rim portion. This corresponds well with the location and spread of the fuel spray impingement portion(s).

According to an embodiment a thickness of the surface coating at each thermal barrier coating layer surface part is thicker in a centre portion than at an outer boundary. The increased thickness results in an increased heat insulation directly underneath, in comparison to a decreased thickness which in turn results in a decreased heat insulation directly underneath. The thickness distribution of the surface coating is hence adapted such that increased heat insulation is achieved in a centre portion in relation to the level of heat insulation at an outer boundary.

According to an embodiment a thickness of the thermal barrier coating layer at each thermal barrier coating layer surface part is greatest at the circumferential rim portion. Thereby the heat insulation is the greatest directly underneath the circumferential rim portion.

According to an embodiment the thickness is smallest at the outer boundary of each thermal barrier coating layer surface part. Thereby the heat insulation is smallest directly underneath the outer boundary of each thermal barrier coating layer surface part.

According to an embodiment the thickness is varying continuously. This is a simple manner to achieve a varying coating layer thickness during production.

According to an embodiment a thickness of the thermal barrier coating layer is 5 to 4000 µm, preferably 20 to 500 µm. For the heat insulation needed for the piston in relation to the heat load in the combustion chamber these thickness levels are well adapted.

According to an embodiment the circumferential rim portion is covered by the thermal barrier coating layer surface parts to between 30 and 70%, preferably to between 40 and 80% and more preferably to between 45 and 55%. These ranges are adapted for an adequate heat load limitation directly underneath the thermal barrier coating layer surface parts in combination with adequate heat absorption at uncoated surface parts of the piston to achieve the overall heat absorption of the piston in the combustion chamber as well as piston material protection.

According to an embodiment each thermal barrier coating layer surface part has a generally rounded surface extension, preferably a generally oval surface extension. This is a simple manner to achieve simple production, but it is also a shape of the surface parts that conforms well to the form of the fuel spray impingement portion.

According to an embodiment the thermal barrier coating layer is bonded to the piston through a bond layer. This improves durability of the surface layer through reducing the mismatch between the thermal expansion coefficients between the basic material of the piston and of the thermal barrier coating material. It may also provide some additional corrosion protection.

According to an embodiment the bond layer is nickel based.

According to an embodiment the bond layer has a thickness of 20 to 250 µm, preferably 75 to 150 µm, and more preferably approximately 100 µm.

The present disclosure relates according to a second aspect to a method for producing a piston for a cylinder for an internal combustion engine, comprising the steps of providing a piston for a cylinder for an internal combustion engine, the piston having a piston bowl surface adapted for facing a combustion chamber of the cylinder, and providing the piston bowl surface with a thermal barrier coating layer, wherein the step of providing the piston bowl surface with a thermal barrier coating layer is made on a plurality of circumferentially spaced surface parts of the piston bowl surface.

The thermal barrier coating has commonly been provided on the whole piston surface in order to insulate the underlying piston material from the direct heat influence and to reduce the heat build-up. When instead providing the thermal barrier coating on a plurality of circumferentially spaced surface parts of the piston bowl surface the heat load is reduced underneath the coated surface parts, whereas the uncoated surface parts are open for heat reception. In comparison to the commonly designed piston, the method of producing a piston according to this disclosure is resulting in a piston which assimilates more heat energy such that surrounding parts of the combustion chamber is exposed to less heat, and at the same time the heat is more evenly distributed within the piston. Underneath the coated surface parts the maximum temperature is reduced in comparison to the general full-coated design, whereas the maximum temperature at the uncoated surface parts may be somewhat increased. The heat energy is hence more evenly distributed within the piston and the maximum temperature at any single point is reduced such that the risk for material degradation is reduced and the risk for coke build-up underneath the piston crown is also reduced. Thereby the durability and expected longevity of the piston is consequently increased.

According to an embodiment the step of providing the piston surface with a thermal barrier coating layer includes the step of applying the thermal barrier coating layer through thermal spraying. Thermal spraying is a simple method which in itself is well known.

According to an embodiment the thermal spraying process is plasma spraying.

According to an embodiment the thermal barrier coating layer is made of a heat insulating ceramic material.

According to an embodiment the heat insulating ceramic material comprises zirconium oxide.

According to an embodiment the piston bowl surface comprises at least one fuel spray impingement portion, and wherein the step of providing the thermal barrier coating layer on a plurality of circumferentially spaced surface parts of the piston bowl surface includes the step of providing at least one of the thermal barrier coating layer surface parts at a position which at least partially covers the fuel spray impingement portion. A piston is subjected to fuel spray impingement at one or several portions within the combustion chamber and a resulting concentrated heat load at that or those portions. Through the method of location of the thermal barrier coating layer surface parts to at least partly covering said fuel spray impingement portion heat build-up at said portion is reduced such that piston material degradation is in turn reduced. Also the coke build-up underneath the piston crown at the fuel spray impingement portion is reduced.

According to an embodiment the step of providing at least one of the thermal barrier coating layer surface parts at a position which at least partially covers the fuel spray impingement portion includes the step of centering the at least one thermal barrier coating layer surface parts with regard to its associated fuel spray impingement portion. A close overlap between the at least one thermal barrier coating layer surface part and the associated fuel spray impingement portion improves the heat or temperature distribution and dissipation within the piston further.

According to an embodiment the step of applying the thermal barrier coating layer is preceded by the step of applying a bond layer through thermal spraying, preferably through plasma spraying. An improved durability of the resulting thermal barrier coating layer is thus achieved.

According to an embodiment the bond layer is nickel based.

According to an embodiment the step of applying the thermal barrier coating layer is preceded by the step of blasting the piston bowl surface, preferably through sand blasting. An improved durability of the resulting thermal barrier coating layer is thus achieved.

According to an embodiment the step of applying the thermal barrier coating layer through thermal spraying includes using a first masking device having openings for each thermal barrier coating layer surface part, such that the thermal spraying only reaches the piston bowl surface at the surface parts. Such a first masking device is a simple manner to achieve both a masking as such of the parts of the piston bowl surface that should remain uncoated, and to achieve an adequate form and location of the unmasked surface parts.

According to an embodiment the step of applying a bond layer through thermal spraying includes using a second masking device having openings for each thermal barrier coating layer surface part, such that the thermal spraying only reaches the piston bowl surface at the surface parts.

According to an embodiment the step of blasting the piston bowl surface includes using a third masking device having openings for each thermal barrier coating layer surface part, such that the thermal spraying only reaches the piston bowl surface at the surface parts.

According to an embodiment the openings of the first masking device is smaller than the openings of the second masking device. This is a simple manner to achieve satisfactory bonding of the thermal barrier coating material to the piston bowl surface.

According to an embodiment the openings of the second masking device is smaller than the openings of the third masking device. This is a simple manner to achieve a satisfactory bonding of the bond material to the piston bowl surface.

According to an embodiment the openings of the first masking device each has an extension which is adapted provide a surface extension of each thermal barrier coating layer surface part which is adapted to lower a temperature of the piston at the surface parts below a threshold temperature, the threshold temperature being a critical temperature for piston material corrosion.

According to an embodiment a position of at least one of the openings of the first masking device is centred at the fuel spray impingement portion.

According to an embodiment each opening of the first masking device is distended from one another.

The present disclosure relates according to a third aspect to an internal combustion engine having at least one piston according the first aspect.

The present disclosure relates according to a fourth aspect to an internal combustion engine having at least one piston produced according to the second aspect.

The present disclosure relates according to a fifth aspect to an internal combustion engine which is a compression ignited internal combustion engine.

The present disclosure relates according to a sixth aspect to a vehicle having an internal combustion engine of any kind disclosed herein.

BRIEF DESCRIPTION OF THE DRAWINGS

With reference to the appended drawings, below follows a more detailed description of embodiments of the invention cited as examples.

In the drawings.

DETAILED DESCRIPTION

Figure 1A:
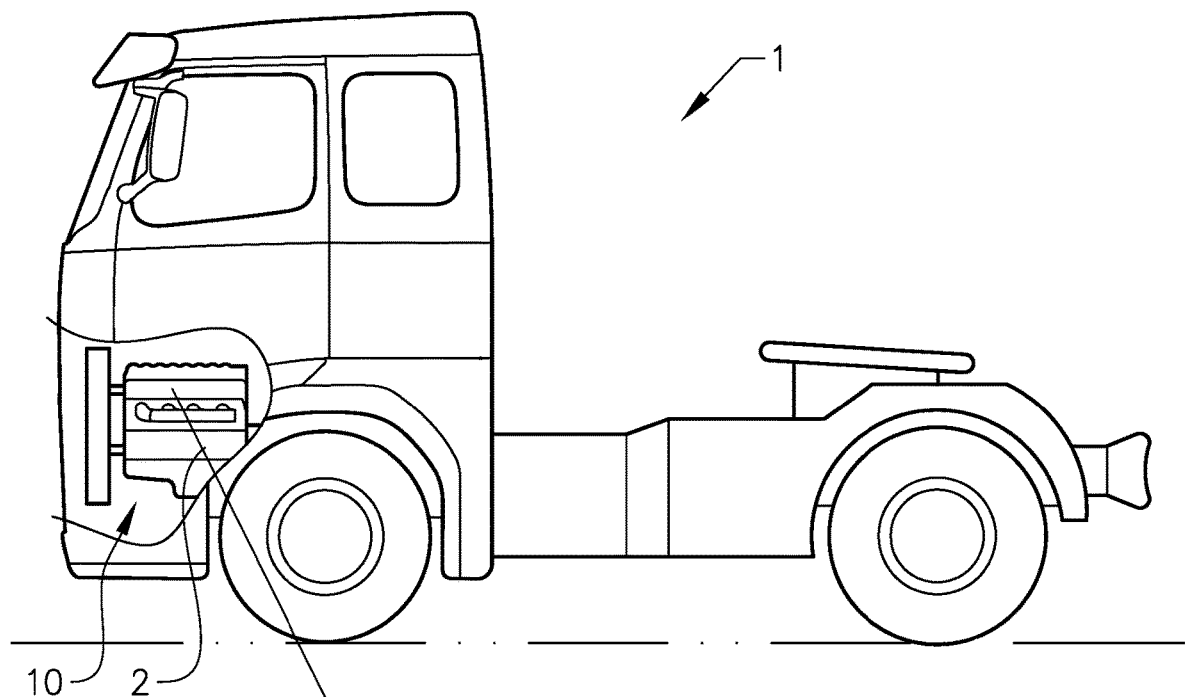
FIG. 1a is a side view of a vehicle showing a cut-away part at the internal combustion engine system having a piston according to the present disclosure.

With reference to FIG. 1a a heavy duty truck 1 is disclosed for which an internal combustion engine system 10 of a kind disclosed in the present disclosure is advantageous. However, the internal combustion engine system 10 may well be implemented also in other types of vehicles, such as in busses, in light-weight trucks, passenger cars, marine applications etc. The internal combustion engine system 10 comprises a compression ignition internal combustion engine 2. The internal combustion engine 2 may be e.g. a diesel engine, which as such may be running on several different types of fuel, such as diesel or dimethyl ether, DME. Other fuel types are well suited, as well as hybrid systems. The internal combustion engine system 10 is provided with at least one, and preferably six to eight cylinders 15, each one having a piston 20 as disclosed herein and in more detail in relation to FIG. 1b.

Figure 1B:
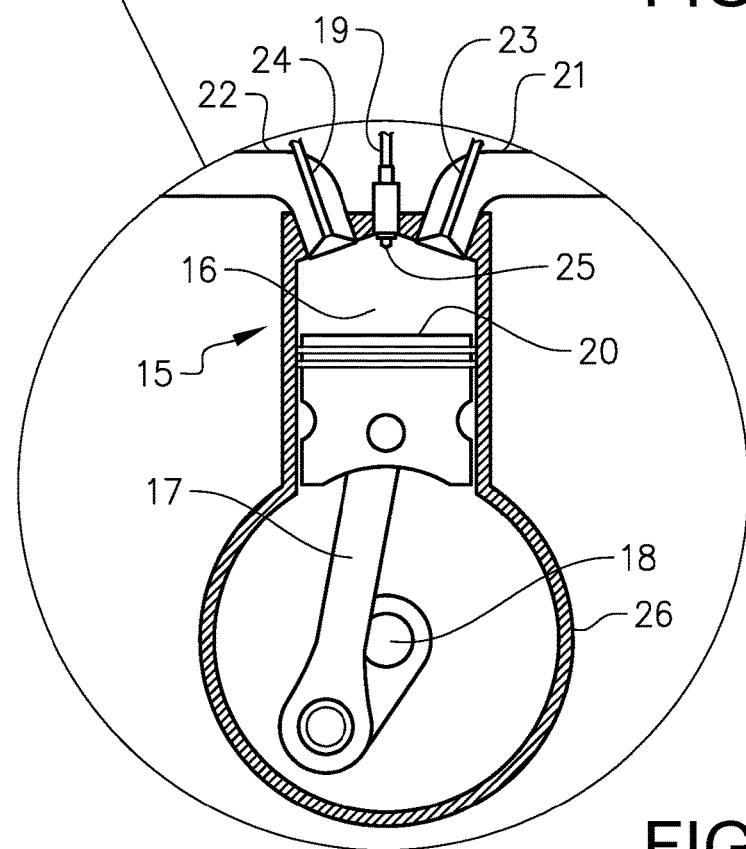
FIG. 1b is a partial cross-section of a cylinder having a piston according to this disclosure.

Each cylinder 15 comprises a reciprocating piston 20, which may be of any type which is suitable for compression ignition. The cylinder 15 is only described in general terms since its parts and functionality is well known in the art. The cylinder 15 configuration may be e.g. straight, V-shaped or any other suitable kind. Each cylinder 15 of FIG. 1b comprises at its vertical top end at least one and preferably two inlet channels 21 for inlet air, and at least one and preferably two outlet channels 22 for exhaust gases from the fuel combustion process taking place within the cylinder 15. Each inlet channel 21 has an inlet valve 23 for controlled inlet of inlet air, and each outlet channel 22 has an outlet valve 24 for controlled outlet of exhaust gases. Located centrally in the cylinder 15, between the inlet channel(s) 21 and the outlet channel(s) 22 an injection valve 19 is located, which at its tip has a fuel injector 25. The location and direction of the injection valve 19 may be of other kinds, such as located slanting to one side and positioned towards a side wall of the cylinder 15. The piston 20 is connected to a connection rod 17, which in turn is connected to a crankshaft 18. The crankshaft 18 is located within a crankcase 26. The combustion causes the piston 20 to reciprocate between its uppermost position, a so called top dead center, TDC, and its lowermost position, the bottom dead center, BDC. In FIG. 1b the piston 20 is located close to its BDC. The volume within the cylinder 15 between the BDC of the piston 20 and the cylinder top is called the combustion chamber 16. This is where i.a. combustion of fuel takes place. Preferably the internal combustion engine system 10 works according to the well-known four-stroke principle, but also i.a. the equally well-known two-stroke and eight-stroke principles are suitable for the piston 20 of the present disclosure.

Figure 2A:
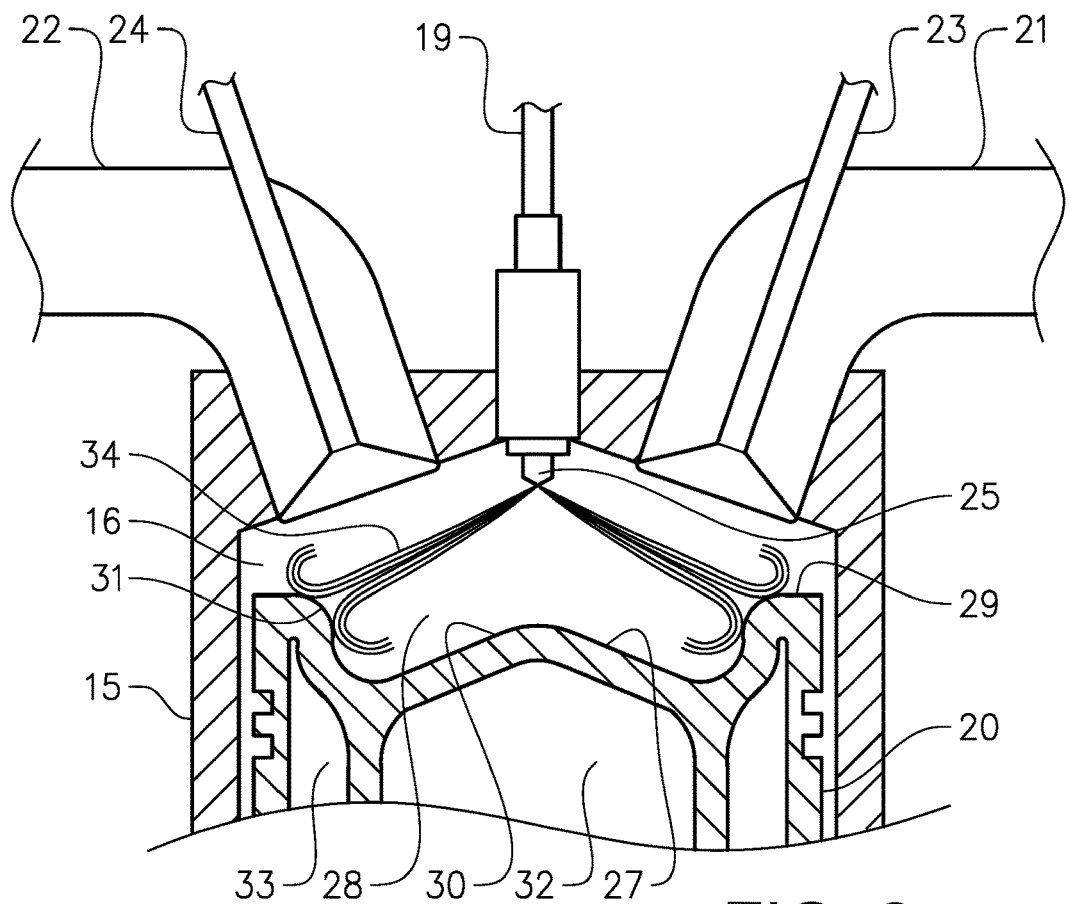
FIG. 2a is a cross-section of an upper part of the cylinder and piston of FIG. 1b during fuel injection.
Figure 2B:
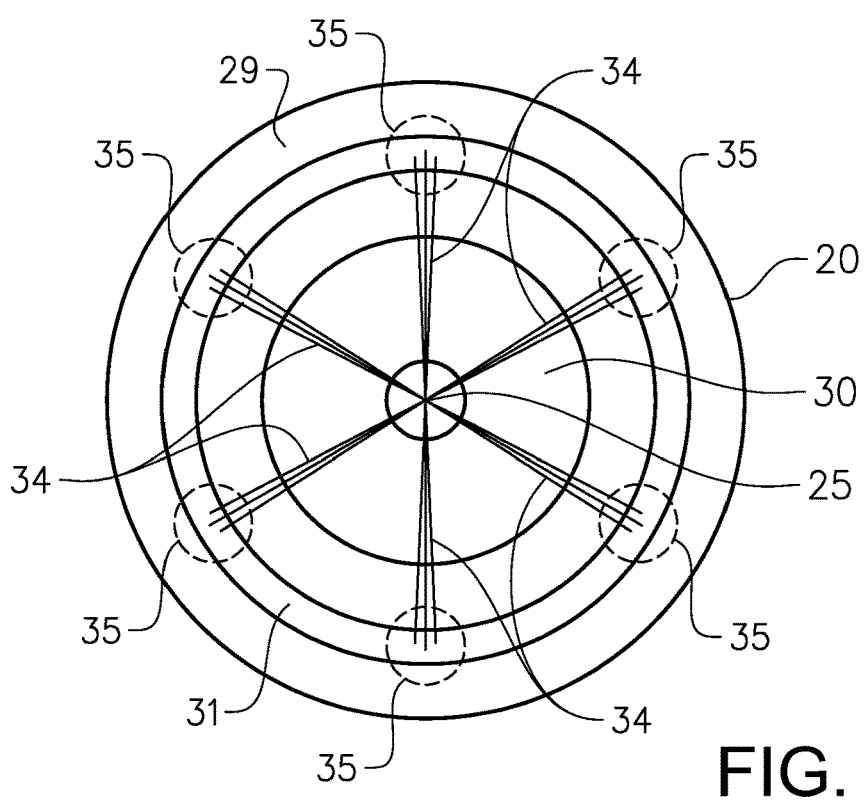
FIG. 2b is a top view showing a piston crown of FIG. 1b during fuel injection.

Turning to FIG. 2a, a piston 20 is shown in cross-section together with the top of the cylinder 15. The piston 20 has a piston crown 29 which comprises the parts located vertically above in the figure. The piston crown 29 has a piston surface 27 which comprises the whole surface which faces the combustion chamber 16 of the cylinder 15. In the present disclosure the piston crown 29 has a centrally located piston bowl 28, which is rotationally symmetrically designed in relation to the piston 20 as a whole. This is also shown in FIG. 2b. The piston bowl 28 is designed as a recess or depression in the piston crown 29. The piston bowl 28 in the present disclosure also has a centrically located elevation, which highest portion however is lower than the remainders of the piston crown 29. The piston bowl 28 has a piston bowl surface 30 and is surrounded by a circumferential rim portion 31 which delimits the piston bowl 28 from the remainders of the piston crown 29. From the highest portion of the central elevation of the piston bowl 28, the piston bowl surface 30 slants generally straight towards the bottom portion, at which bottom portion the piston bowl surface 30 again raises generally straight and rather steeply towards the circumferential rim portion 31. The remainders of the piston crown 29, to the outside of the circumferential rim portion 31, are generally flat. This configuration of the piston bowl 28 is sometimes referred to as a "Mexican hat".

Underneath the piston crown 29 there are two, from above mutually separated, volumes: an inner and centrally located cooling chamber 32 and an outer and circumferentially located cooling gallery 33. An annular piston skirt marks the outer diameter of the piston 20. The parts protruding downwardly in FIG. 2a from the piston crown 29 are the parts through which a (not disclosed) pin bore is located, which is adapted to receive a (not disclosed) pin for connection to the connection rod 17.

The fuel injector 25 has a plurality of (not disclosed) fuel openings which are adapted to inject fuel into the combustion chamber 16. In the present disclosure there are six evenly spread openings, resulting in six separated fuel spray plumes 34 around the fuel injector 25. This may be better seen in FIG. 2b. The fuel spray plumes 34 are here seen together with the piston crown 29. The fuel openings are located such that each fuel spray plume 34 generally hits the circumferential rim portion 31. When hitting the circumferential rim portion 31, the fuel spray plumes 34 are splashing both upwards and downwards such that the fuel is well distributed within the combustion chamber 16. Each fuel spray plume 34 hits a fuel spray impingement portion 35 on the piston crown 29. During use of the piston 20, especially during the combustion of the fuel, the material of the piston 20 at the fuel spray impingement portions 35 is subjected to high temperatures. The high temperatures are building up also within the piston 20 itself and possibly within the cylinder 15, unless at least the piston bowl surface 27 is protected from heat through an insulating coating according to the present disclosure. Such insulating coating is generally called a thermal barrier coating. The thermal barrier coating material is a porous heat insulating ceramic material comprising zirconium oxide.

The layouts of the cylinder 15 and of the piston 20 may be otherwise designed than the one disclosed herein. For example the piston 20 may be designed having a non-rotationally symmetrical cylindrical configuration to correspond to a non-cylindrical configuration of the devices at the top of the cylinder 15. The fuel injector 25 may be located towards the side of the top of the cylinder 15 and from such a location direct fuel spray plumes 34 into the cylinder 15 in a slanting manner. The fuel injector 25 may furthermore direct one or several slightly flattened rather than circular fuel spray plume(s) 34 towards the combustion chamber and the piston 20. Another example is the shape, size and location of the piston bowl 28. It may be non-rotationally symmetrical, it may be shallower and having a smaller diameter. It may have a circumferential rim portion 31 which has a smaller radius of curvature and a smaller elevation, if any one at all. And so on.

Figure 3:
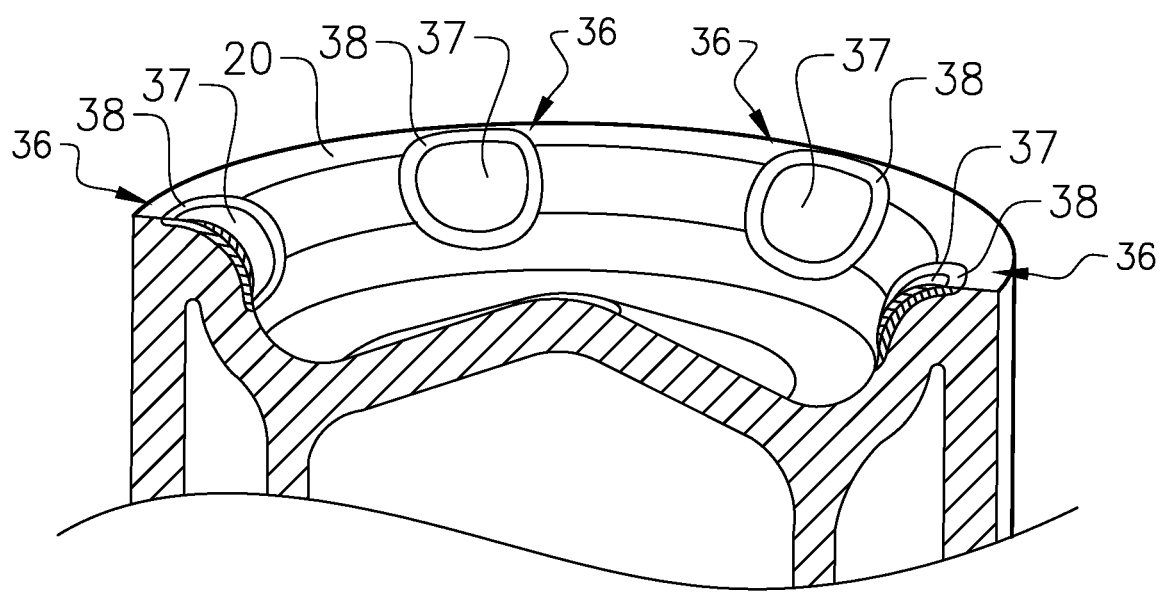
FIG. 3 is a perspective view in cross-section showing the piston of FIG. 1b
Figure 4:
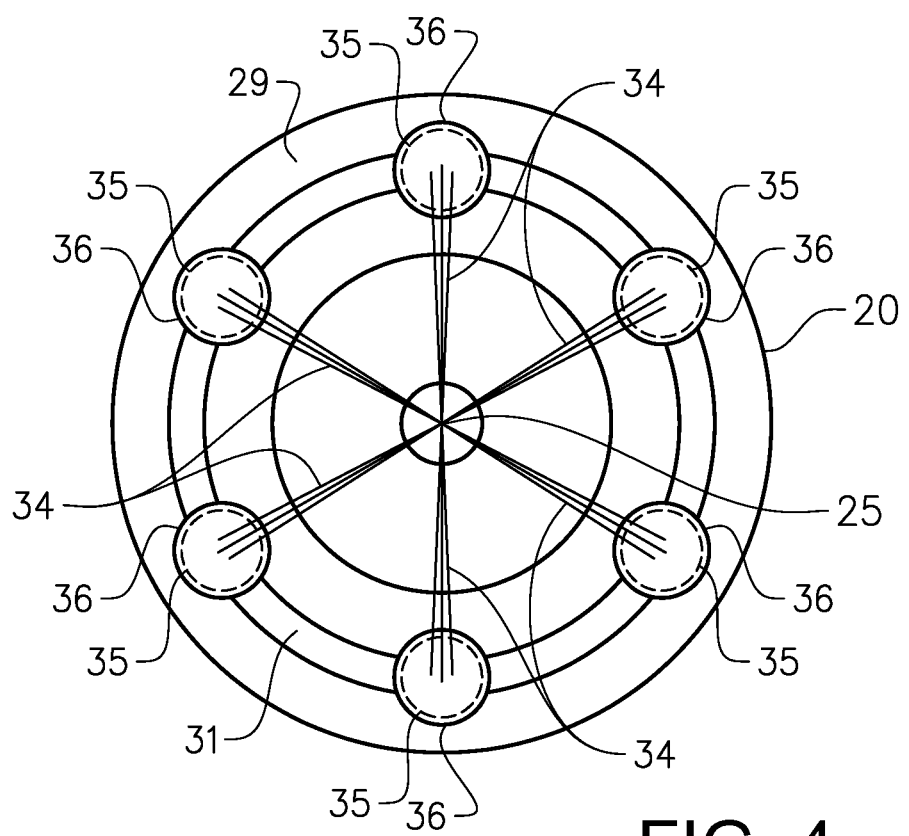
FIG. 4 is a top view showing the piston crown of FIG. 1b during fuel injection.

Turning now to a description of a first embodiment of the present disclosure, this will be provided based on FIGS. 3 and 4. Evenly spread around the piston bowl 28, on the piston surface 27 and centred at the circumferential rim portion 31 are six circumferentially spaced surface parts 36 which are coated with a thermal barrier coating layer 37. In FIG. 3 only half of the surface parts 36 are visible due to the sectioning of the piston 20 in the figure. The thermal barrier coating layer surface parts 36 are located at, and has an extension along, the circumferential rim portion 31 of the piston 20. The thermal barrier coating layer surface parts 36 are distended from one another along the circumferential rim portion 31 by a part of the piston bowl surface 30 which has not been provided with any thermal barrier coating layer 37.

It is also true that, each thermal barrier coating layer surface part 36 is surrounded by a piston bowl surface 30 without any thermal barrier coating layer 37. Each thermal barrier coating layer surface part 36 has an extension into the piston bowl 28. It also has an extension on both sides of the circumferential rim portion 31. Each thermal barrier coating layer surface part 36 has a generally rounded surface extension, which in the disclosed embodiment is a generally oval surface extension.

The thickness of the surface coating at each thermal barrier coating layer surface part 36 is thicker in a centre portion than at an outer boundary thereof. The thickness of the thermal barrier coating layer 37 at each thermal barrier coating layer surface part 36 is greatest at the circumferential rim portion 31. The thickness is smallest at the outer boundary of each thermal barrier coating layer surface part 36. The thickness is varying continuously. This may be gleaned from FIG. 3 from the two sectioned surface parts 36. The thickness of the thermal barrier coating layer 37 is 5 to 4000 µm, preferably 20 to 500 µm. The circumferential rim portion 31 is covered by the thermal barrier coating layer surface parts 36 to between 30 and 70%, preferably to between 40 and 80% and more preferably to between 45 and 55%. Another way to describe the thermal barrier coating layer surface parts 36 is that they are discreet surface parts 36, which are distended from one another through uncoated surface parts 36 of the piston 20.

The thermal barrier coating layer 37 is bonded to the piston 20 through a bond layer 38. The bond layer 38 is nickel based and has a thickness of 20 to 250 µm, preferably 75 to 150 µm, and more preferably approximately 100 µm.

Turning now to FIG. 4, the fuel spray impingement portions 35 are disclosed in relation to the location of the thermal barrier coating layer surface parts 36. It is specifically noted that each thermal barrier coating layer surface part 36 is centred with regard to its associated fuel spray impingement portion 35, such that thermal barrier coating layer surface parts 36 at least partially covers the fuel spray impingement portions 35. In the present embodiment all of the thermal barrier coating layer surface parts 36 are of equal size and location.

Figure 5:
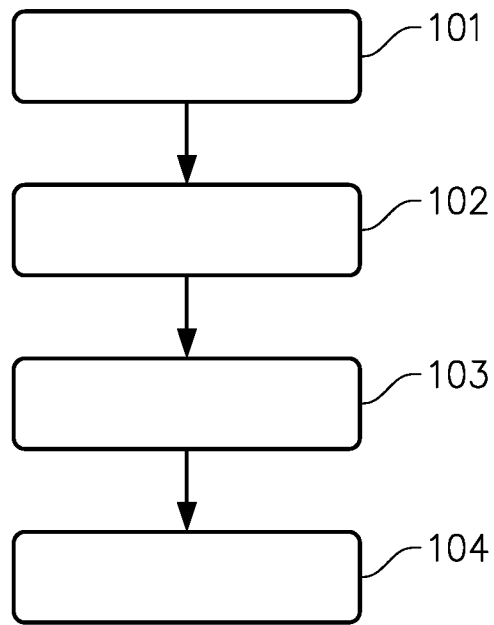
FIG. 5 is a block diagram showing the steps of a method for producing a piston of FIG. 1b.

With reference to FIG. 5 the method of producing a piston 20 for a cylinder 15 for an internal combustion engine 2 will now be disclosed. In Step 101 a piston 20 is provided. The piston 20 is in itself produced according to generally known methods and is not further discussed here. The piston 20 is preferably uncoated. In Step 102 at least parts of the piston bowl surface 30 which should be covered by the thermal barrier coating layer surface parts 36 are blasted, preferably through sand blasting. Possibly however the whole piston 20 may be blasted. In Step 103 a bond layer 38 is applied at least at the parts of the piston bowl surface 30 which should be covered by the thermal barrier coating layer surface parts 36 through thermal spraying. It is preferably done through plasma spraying. In Step 104 the piston bowl surface 30 is provided with a thermal barrier coating layer 37 on top of the bond layers 38 which were provided in Step 103. The thermal barrier coating layer 37 is provided on a plurality of circumferentially spaced surface parts 36 of the piston bowl surface 30. It is noted that for each step the blasting, the application of a bond layer 38 and the application of a thermal barrier coating layer 37 respectively, are made simultaneously for all of the circumferentially spaced surface parts 36 on the piston bowl surface 30. It may however be made for one or several at a time.

As could be seen from FIG. 2b, the piston bowl surface 30 comprises according to the disclosed embodiment six evenly spread fuel spray impingement portions 35. The provision of thermal barrier coating layers 37 on the circumferentially spaced surface parts 36 is made such that the thermal barrier coating layer surface parts 36 at least partially, and preferably fully, cover the fuel spray impingement portions 35. The provision of thermal barrier coating layers 37 on the circumferentially spaced surface parts 36 is also made such that each thermal barrier coating layer surface part 36 is centered with regard to its associated fuel spray impingement portion 35. A somewhat thicker middle or center portion of each thermal barrier coating layer surface part 36 is achieved through directing the thermal spraying towards this portion slightly longer than towards other, surrounding parts, for the deposition of more thermal barrier coating material in this portion.

Figure 6A:
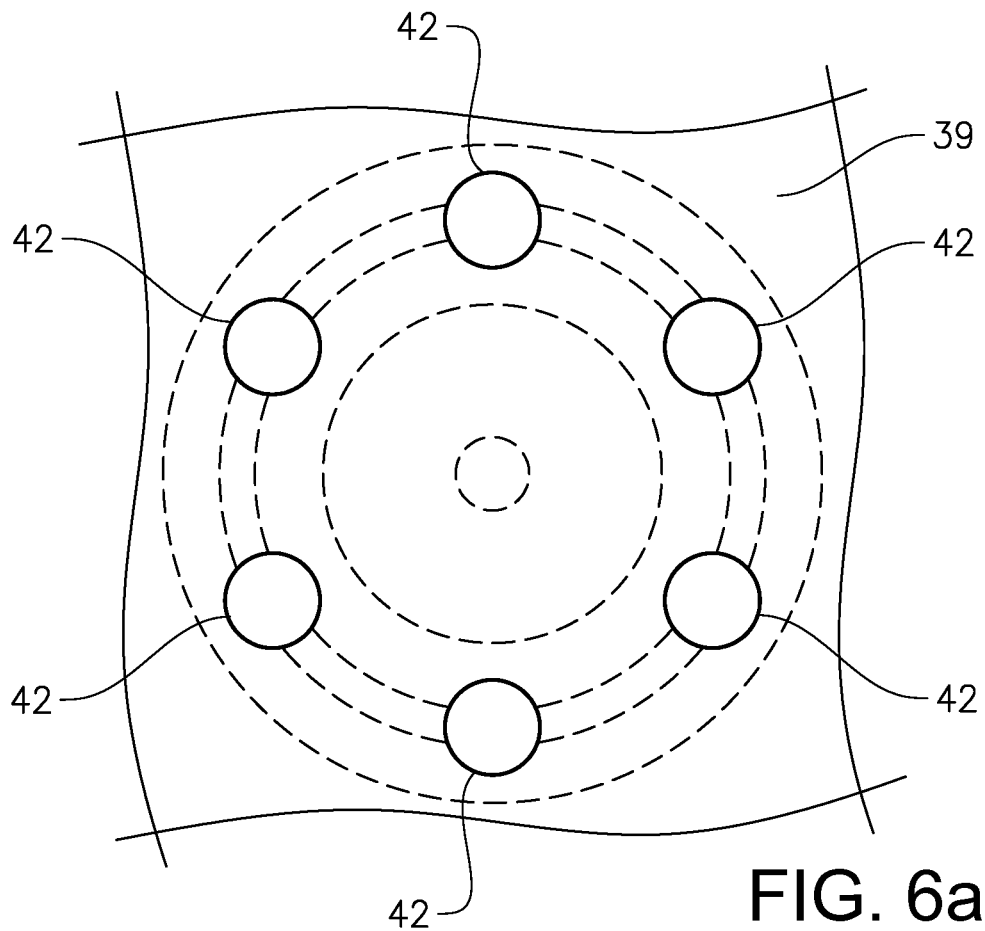
FIG. 6a is a schematical top view of a first masking device which is used in the production of a piston of FIG. 1b.
Figure 6B:
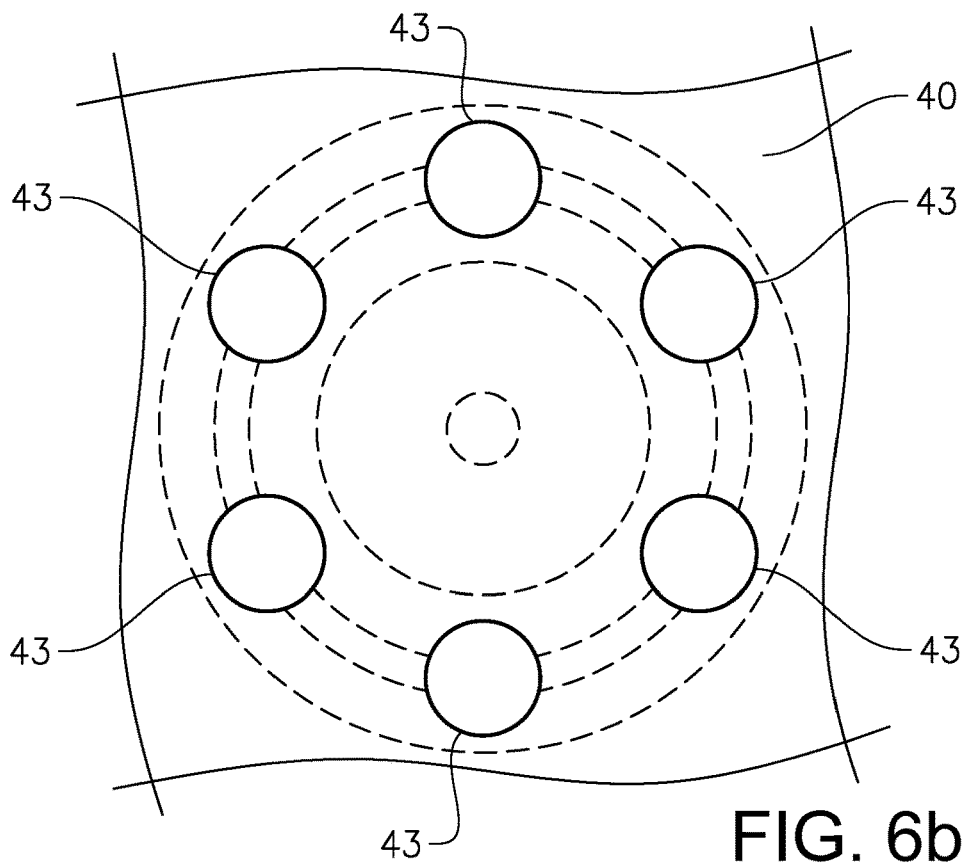
FIG. 6b is a schematical top view of a second masking device which is used in the production of a piston of FIG. 1b.
Figure 6C:
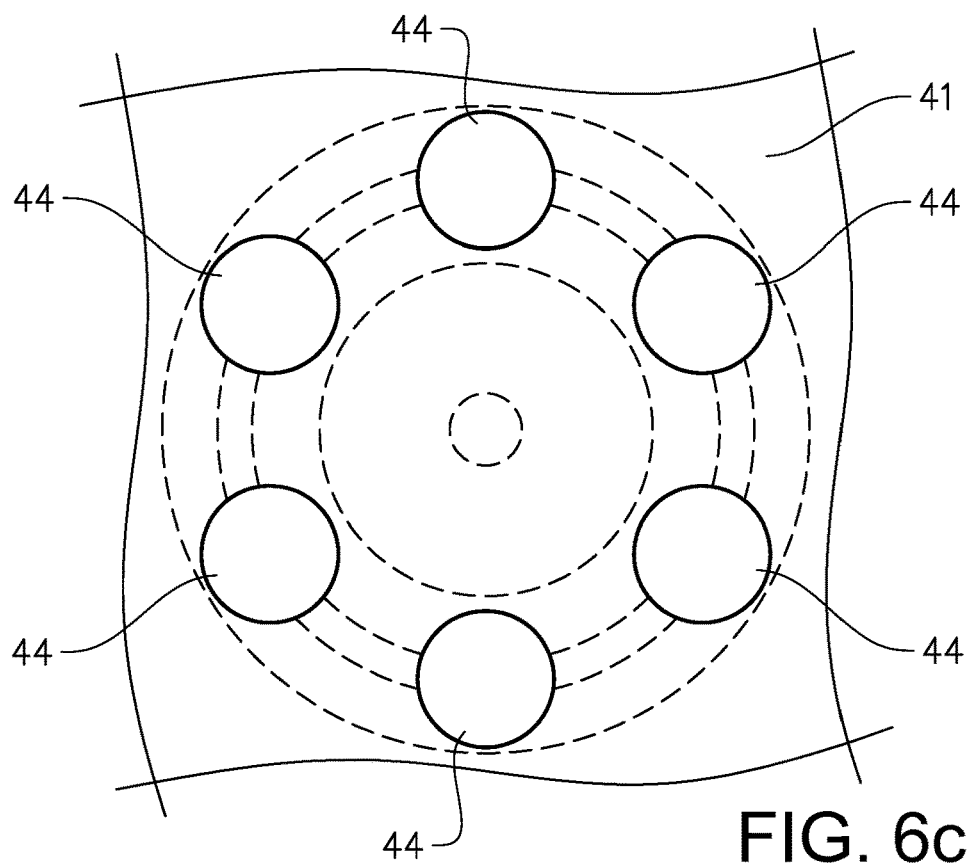
FIG. 6c is a schematical top view of a third masking device which is used in the production of a piston of FIG. 1b.

In FIGS. 6a to 6c different masking devices 39, 40, 41 which are used in the production of a piston 20 according to this disclosure are disclosed. Each masking device 39, 40, 41 may be made of any material, preferably metallic, which is able to withstand the wear which is applied to it through the application of a thermal barrier coating to the disclosed piston 20. Each masking device 39, 40, 41 is further generally shaped as a plate in which openings 42, 43, 44 are located at locations corresponding to each thermal barrier coating surface part 36. In all of the figures FIGS. 6a, 6b and 6c the position of the piston 20 during its production is indicated through dashed lines. The shape of the masking devices 39, 40, 41 may preferably be one that conforms to the shape of the piston 20 to be coated. It is noted that each opening 42, 43, 44 of each masking device 39, 40, 41 is distended from one another. Each opening 42, 43, 44 is shaped and configured to produce a corresponding thermal barrier coating surface part 36 which has the desired shape, location and size. Due to the manner of producing the thermal barrier coating surface parts 36, i.e. preferably through thermal spraying and sand blasting, the openings 42, 43, 44 may not necessarily have the exact size and shape as the resulting thermal barrier coating surface parts 36, but rather one which gives the thermal spraying and sand blasting materials access to the piston 20 during production at the desired locations.

In FIG. 6a a first masking device 39 is disclosed which has one opening 42 for each thermal barrier coating surface part 36 of the piston 20, i.e. a total of six openings 42. The openings are provided and located such that the thermal spraying only reaches the piston surface 27 at the surface parts 36. In FIG. 6b a second masking device 40 is disclosed which has one opening 43 for each thermal barrier coating surface part 36 of the piston 20, i.e. a total of six openings 43. The openings 43 are provided and located such that the thermal spraying only reaches the piston surface 27 at the surface parts 36. In FIG. 6c a third masking device 41 is disclosed which has one opening 44 for each thermal barrier coating surface part 36 of the piston 20, i.e. a total of six openings 44. The openings 44 are provided and located such that the thermal spraying only reaches the piston surface 27 at the surface parts 36. It is noted that the openings 44 of the third masking device 41 are larger than the openings 43 of the second masking device 40, which openings 43 in turn are larger than the openings 42 of the first masking device 39.

Turning back to FIG. 5, the third masking device 41 is used in connection with Step 102 during sand blasting of the piston 20. The second masking device 40 is used in connection with Step 103 and the provision of a bond layer 38 on the piston surface, and the first masking device 39 is used in connection with Step 104 and the provision of the thermal barrier coating layer 37 on the surface parts 36 in question.

According to an alternative embodiment of the present disclosure the number of fuel spray plumes 34 may be different from the number which is disclosed earlier herein. The number may be both odd as well as even. The number of fuel spray impingement portions 35 on the piston 20 corresponds to the number of fuel spray plumes 34. It is consequently also preferably to adapt the number of thermal barrier coating layer surface parts 36 both in size and location to the number of fuel spray impingement portions 35 and fuel spray plumes 34. The number may be from one to a number higher than six.

The thermal barrier coating layer surface parts 36 may also be located at other locations on the piston 20 and piston bowl surface 30 than earlier disclosed. They may also be spread in an uneven manner around the piston 20 and piston bowl surface 30. Furthermore the size and shape of the thermal barrier coating layer surface parts 36 may be different between them. Some may be equal, and others unequal. Also the thickness and thickness distribution may be different between them. Also other parts of the piston 20 and of the piston bowl surface 30 than the fuel spray impingement portions 35 may be covered by thermal barrier coating layer surface parts 36. At least one of the thermal barrier coating layer surface parts 36 should at least to some extent cover one of the fuel spray impingement portions 35 if there are several ones present.

The thermal barrier coating layer surface parts 36 may also be produced such that their upper surface, which is facing the combustion chamber 16 of the cylinder 15, may also be produced such that it is levelled with the surrounding uncoated surface parts. This may e.g. be achieved through the creation of pockets in the piston surface 27. Such pockets may in turn be produced through milling. This results in a levelled piston surface 27 which later may be polished or otherwise post processed.

The piston 20 may generally be post processed as a further step after Step 104. In such a post processing step the resulting piston 20 including the thermal barrier coating layer surface parts 36 may be machined in order to even better distribute the heat over the piston surface 27. This may be done regardless of whether the thermal barrier coating layer surface parts 36 are levelled with the basic piston surface 27, or is protruding therefrom, such as in the embodiment disclosed in FIG. 3. Such machining includes, but is not limited to polishing.

An alternative heat insulating ceramic material may comprise aluminium oxide, titanium oxide or zirconium silicate, but also other ceramics may be useful. In the case of a zirconium oxide, it could be stabilised by yttrium oxide, magnesium oxide, cerium oxide, lathanuum oxide or any other relevant stabiliser.

The thermal barrier coating layer 37 may be applied directly onto the piston surface 27 without any use of a bond layer 38. If a bond layer 38 is used it is preferably made of a metallic material. Such materials are usually based on nickel or iron with other alloying materials such as chrome, aluminium or yttrium.

Alternative ways to apply the thermal barrier coating material and possibly the bond layer 38 material are for example flame spraying, wire-arc spraying and HVOF spraying.

Figure 7:
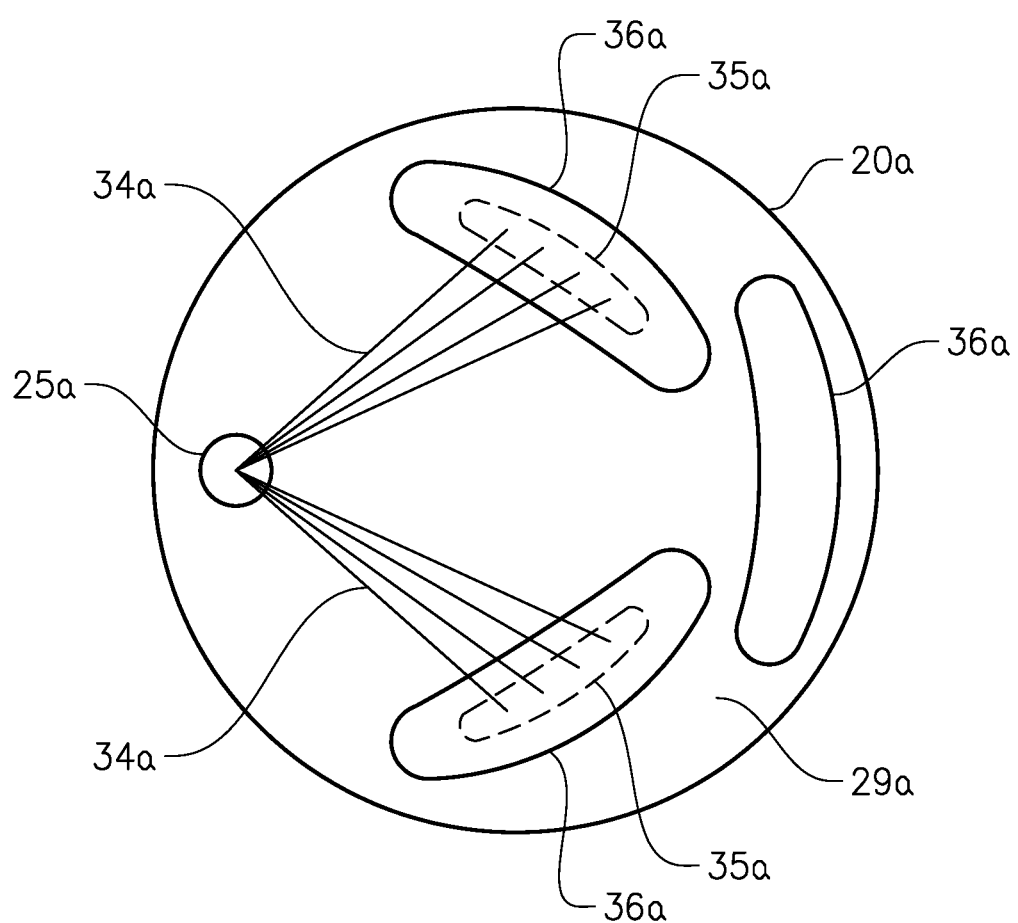
FIG. 7 is a top view showing an alternative piston crown according to this disclosure.

An alternative embodiment of the present disclosure is shown in FIG. 7, in which only two fuel spray impingement portions 35a are present on the piston 20a due to the presence of only two fuel spray plumes 34a. The fuel injector 25a is located asymmetrical in relation to the piston 20a and directing the fuel spray plumes 34a generally only towards one half of the piston 20a. The thermal barrier coating surface parts 36a do not fully cover the fuel spray impingement portions 35a, but on the other hand there is also yet another thermal barrier coating surface part 36a which is located at a position on the piston 20a onto which position no fuel spray is directed. The respective thermal barrier coating surface parts 36a are also not generally circular but instead of a more oval and extended shape. The piston 20a may have a piston bowl 28a (not disclosed) which has depressions at the fuel spray impingement portions 35a. The thermal barrier coating surface parts 36a are however located in a circumferentially spaced manner. It is noted however that also according to this embodiment the thermal barrier coating layer 37a is provided on a plurality of circumferentially spaced surface parts 36a of the piston bowl surface 30a.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

The invention claimed is:

1. A piston for a cylinder for an internal combustion engine, the piston having a piston bowl surface adapted for facing a combustion chamber of the cylinder, the piston bowl surface being provided with a thermal barrier coating layer, wherein the thermal barrier coating layer is provided on a plurality of circumferentially spaced surface parts of the piston bowl surface.

2. A piston according to claim 1, wherein a surface extension of each thermal barrier coating layer surface part is adapted to lower a temperature of the piston at the surface part below a threshold temperature, the threshold temperature being a critical temperature for piston material corrosion.

3. A piston according to claim 1, wherein the thermal barrier coating layer is made of a heat insulating ceramic material.

4. A piston according to claim 3, wherein the heat insulating ceramic material comprises zirconium oxide.

5. A piston according to claim 1, wherein the piston bowl surface comprises at least one fuel spray impingement portion and wherein a position of at least one of the thermal barrier coating layer surface parts at least partly covers the fuel spray impingement portion.

6. A piston according to claim 5, wherein at least one of the thermal barrier coating layer surface parts is centered with regard to its associated fuel spray impingement portion.

7. A piston according to claim 1, wherein the piston bowl surface comprises a circumferential rim portion and a floor portion connected to and surrounded by the circumferential rim portion, wherein at least one of the thermal barrier coating layer surface parts is located at and has an extension along the circumferential rim portion.

8. A piston according to claim 7, wherein each thermal barrier coating layer surface part along the rim portion is distended from one another by a piston bowl surface without any thermal barrier coating layer.

9. A piston according to claim 8, wherein each thermal barrier coating layer surface part is surrounded by a piston bowl surface without any thermal barrier coating layer.

10. A piston according to claim 7, wherein each thermal barrier coating layer surface part has an extension into a piston bowl.

11. A piston according to claim 7, wherein each thermal barrier coating layer surface part has an extension on both sides of the circumferential rim portion.

12. A piston according to claim 1, wherein a thickness of the surface coating at each thermal barrier coating layer surface part is thicker in a center portion than at an outer boundary.

13. A piston according to claim 1, wherein a thickness of the thermal barrier coating layer at each thermal barrier coating layer surface part is greatest at a circumferential rim portion.

14. A piston according to claim 13, wherein the thickness is smallest at the outer boundary of each thermal barrier coating layer surface part.

15. A piston according to claim 12, wherein the thickness is varying continuously.

16. A piston according to claim 1, wherein a thickness of the thermal barrier coating layer is 5 to 4000.mu.m.

17. A piston according to claim 1, wherein the circumferential rim portion is covered by the thermal barrier coating layer surface parts to between 30 and 70%.

18. A piston according to claim 1, wherein each thermal barrier coating layer surface part has a generally rounded surface extension, preferably a generally oval surface extension.

19. A piston according to claim 1, wherein the thermal barrier coating layer is bonded to the piston through a bond layer.

20. A piston according to claim 18, wherein the bond layer is nickel based.

21. A piston according to claim 19, wherein the bond layer has a thickness of 20 to 250.mu.m, preferably 75 to 150.mu.m, and more preferably approximately 100 .mu.m.

22. A method for producing a piston for a cylinder for an internal combustion engine, comprising the steps of providing a piston for a cylinder for an internal combustion engine, the piston having a piston bowl surface adapted for facing a combustion chamber of the cylinder; and providing the piston bowl surface with a thermal barrier coating layer; wherein the step of providing the piston bowl surface with a thermal barrier coating layer is made on a plurality of circumferentially spaced surface parts of the piston bowl surface.

23. A method according to claim 22, wherein the step of providing the piston bowl surface with a thermal barrier coating layer includes the step of: applying the thermal barrier coating layer through thermal spraying.

24. A method according to claim 22, wherein the thermal spraying process is plasma spraying.

25. A method according to claim 22, wherein the thermal barrier coating layer is made of a heat insulating ceramic material.

26. A method according to claim 25, wherein the heat insulating ceramic material comprises zirconium oxide.

27. A method according to claim 22, wherein the piston bowl surface comprises at least one fuel spray impingement portion, and wherein the step of providing the thermal barrier coating layer on a plurality of circumferentially spaced surface parts of the piston bowl surface includes the step of: providing at least one of the thermal barrier coating layer surface parts at a position which at least partially covers the fuel spray impingement portion.

28. A method according to claim 27, wherein the step of providing at least one of the thermal barrier coating layer surface parts at a position which at least partially covers the fuel spray impingement portion includes the step of: centering the at least one thermal barrier coating layer surface parts with regard to its associated fuel spray impingement portion.

29. A method according to claim 27, wherein the step of applying the thermal barrier coating layer is preceded by the step of: applying a bond layer through thermal spraying, preferably through plasma spraying.

30. A method according to claim 29, wherein the bond layer is nickel based.

31. A method according to claim 22, wherein the step of applying the thermal barrier coating layer is preceded by the step of: blasting the piston bowl surface, preferably through sand blasting.

32. A method according to claim 31, wherein the step of applying the thermal barrier coating layer through thermal spraying includes using a first masking device having openings for each thermal barrier coating layer surface part, such that the thermal spraying only reaches the piston bowl surface at the surface parts.

33. A method according to claim 32, wherein the step of applying a bond layer through thermal spraying includes using a second masking device (40) having openings for each thermal barrier coating layer surface part, such that the thermal spraying only reaches the piston bowl surface at the surface parts.

34. A method according to claim 33, wherein the step of blasting the piston bowl surface includes using a third masking device having openings for each thermal barrier coating layer surface part, such that the thermal spraying only reaches the piston bowl surface at the surface parts.

35. A method according to claim 33, wherein the openings of the first masking device is smaller than the openings of the second masking device.

36. A method according to claim 34, wherein the openings of the second masking device is smaller than the openings of the third masking device.

37. A method according to claim 32, wherein the openings of the first masking device each has an extension which is adapted provide a surface extension of each thermal barrier coating layer surface part which is adapted to lower a temperature of the piston at the surface parts below a threshold temperature, the threshold temperature being a critical temperature for piston material corrosion.

38. A method according to claim 32, wherein a position of at least one of the openings of the first masking device is centered at the fuel spray impingement portion.

39. A method according to claim 32, wherein each opening of the first masking device is distended from one another.

40. An internal combustion engine having at least one piston according to claim 1.

41. An internal combustion engine having at least one piston produced according to the method of claim 22.

42. An internal combustion engine according to claim 40, which is a compression ignited internal combustion engine.

43. A vehicle having an internal combustion engine according to claim 40.

* * * * *